United States Patent [19]

Dexter et al.

[11] Patent Number: 4,754,011

[45] Date of Patent: Jun. 28, 1988

[54] EMULSION COPOLYMERS OF META- OR PARA-ISOPROPENYL-ALPHA, ALPHA-DI-METHYLBENZYLISOCYA-NATES

[75] Inventors: Robin W. Dexter, Georgetown; Peter S. Forgione; John A. Sedlak, both of Stamford, all of Conn.

[73] Assignee: American Cyanamid Company, Stamford, Conn.

[21] Appl. No.: 563,883

[22] Filed: Dec. 21, 1983

Related U.S. Application Data

[63] Continuation-in-part of Ser. No. 499,922, Jun. 1, 1983, abandoned.

[51] Int. Cl.⁴ ............................................. C08F 12/14
[52] U.S. Cl. .................................................. 526/310
[58] Field of Search ............................. 526/301, 310; 260/453 AR

[56] References Cited

U.S. PATENT DOCUMENTS

| | | | |
|---|---|---|---|
| 2,187,146 | 1/1940 | Calcott et al. | 528/481 |
| 2,326,287 | 8/1943 | Coffmann | 526/310 |
| 2,468,713 | 4/1949 | Kropa et al. | 260/453 AR |
| 2,606,892 | 8/1952 | Kropa et al. | 526/310 |
| 2,647,884 | 8/1953 | Wystrach | 260/453 AR |
| 3,551,390 | 12/1970 | Krimm et al. | 526/310 |
| 3,585,167 | 6/1971 | Naarmann et al. | 525/384 |
| 3,793,417 | 2/1974 | Erikson et al. | 260/453 AR |
| 4,008,247 | 2/1977 | Tucker | 525/384 |
| 4,103,074 | 7/1978 | Hertel et al. | 528/488 |
| 4,302,377 | 11/1981 | Gurak et al. | 528/488 |

OTHER PUBLICATIONS

Journal of Applied Chem. U.S.S.R., vol. 45, No. 2, pp. 462–463, Feb. 1972.

Primary Examiner—Joseph L. Schofer
Assistant Examiner—Peter F. Kulkosky
Attorney, Agent, or Firm—Roger S. Benjamin

[57] ABSTRACT

A method of making a copolymer of meta- or para-isopropenyl- $\alpha,\alpha$-dimethylbenzylisocyanate and at least one other ethylenically unsaturated comonomer polymerizable therewith, comprising polymerizing the meta- or para-isopropenyl- $\alpha,\alpha$-dimethylbenzylisocyanate and at least one other ethylenically unsaturated comonomer in an aqueous emulsion in the presence of a free-radical polymerization initiator and a chain transfer agent to control molecular weight.

Also disclosed are methods of breaking the aqueous emulsion after polymerization is completed by either adding a salt, e.g., aluminum sulfate, or by freezing the emulsion followed by thawing to yield the copolymer as a mechanically separable solid phase of a two-phase liquid-solid mixture.

12 Claims, No Drawings

EMULSION COPOLYMERS OF META- OR PARA-ISOPROPENYL-ALPHA, ALPHA-DI-METHYLBENZYLISOCYANATES

CROSS REFERENCE TO RELATED APPLICATION

This application is a continuation-in part of copending application Ser. No. 499,922, filed June 1, 1983, now abandoned.

FIELD OF THE INVENTON

This invention relates to polymers of meta- or para-isopropenyl-$\alpha,\alpha$-dimethylbenzylisocyanate of controlled molecular weight and to a method of making same by emulsion polymerization.

DESCRIPTION OF THE PRIOR ART

In U.S. patent application Ser. No. 400,799, filed July 22, 1982, now U.S. Pat. No. 4,439,616 there is disclosed a method for producing tertiary aralkyl isocyanates, such as tetramethyl xylylene diisocyanates (TMXDI), by thermal cracking of corresponding urethanes formed by addition of corresponding olefins and carbamic acid esters at moderate temperatures and in the presence of acid catalyst. Such process is particularly useful for producing the meta- and para-isomers of TMXDI and as the by-product thereof, substantial amounts of the corresponding vinyl isocyanate meta- or para-isomers, viz., meta-isopropenyl-$\alpha,\alpha$-dimethylbenzylisocyanate (m-TMI) or para-isopropenyl-$\alpha,\alpha$-dimethylbenzylisocyanate (p-TMI), respectively, are formed.

The meta-TMI or para-TMI by-products in such systems may be recycled within the process to improve the over-all yield of TMXDI therein, but such by-products have substantial utility per se as separate products due to their difunctional character, i.e., the presence of reactive isocyanato (—NCO) and vinyl groups. Thus, TMI may be homo- or co-polymerized to form polymers with isocyanate functionality which are cross-linkable with curatives containing a difunctional or polyfunctional amino or hydroxyl compound. Such crosslinkable compositions have film-forming properties and advantageously may be used for coatings as for example on metal, wood and glass substrates, as well as having potential applicability for production of molded articles, such by the reaction injection molding (RIM).

U.S. Pat. No. 3,290,350 discloses copolymerization of TMI by conventional methods using known addition polymerization initiators, such as those of the free radical type, e.g., peroxy and azo initiators.

In U.S. Pat. No. 3,502,475, there is disclosed a method of forming a coating on polyolefin and polyester films, by application thereto of an aqueous dispersion of a copolymer of from about 1 to about 50 percent by weight of meta- or para-TMI.

Relative to other modes of polymerization, emulsion polymerization allows a rapid reaction to form a high molecular weight product with a comparatively narrow molecular weight distribution. The latter characteristic of narrow molecular weight distribution, renders emulsion polymerization potentially attractive for the making of copolymers. However, for most end-use applications, the extremely high molecular weights yielded by emulsion polymerization renderes polymers produced thereby wholly unsuitable, e.g., in end-use applications such as coatings and the molding of articles such as by reaction injection molding. For example, prior art homopolymers of TMI are generally in the range of 167,000, or even higher, and copolymers are generally greater than 100,000. The present process easily produces copolymers in the molecular weight range of 2,000–70,000.

Accordingly, it is an object of the present invention to provide a method of making relatively low molecular weight copolymers of meta-TMI or para-TMI by emulsion copolymerization.

It is another object of the invention to provide copolymers of the above type which are soluble in common coating solvents, substantially linear in structure, and which are substantially free of unsaturation and crosslinking, and which contain no more than about 0.1 weight percent of water.

It is a still further object of the invention to provide a method of emulsion copolymerization of meta- or para-TMI and other ethylenically unsaturated comonomers, wherein the product copolymer readily may be separated from the reacted emulsion, to isolate the copolymer for purification and end-use applications.

Other objects and advantages of the invention will be apparent from the ensuing disclosure and appended claims.

SUMMARY OF THE INVENTION

The present invention relates to a method of making a copolymer of meta- or para-isopropenyl-$\alpha,\alpha$-dimethylbenzylisocyanate and at least one other ethylenically unsaturated comonomer polymerizable therewith, comprising polymerizing the meta or paraisopropenyl-$\alpha, \alpha$-dimethylbenzylisocyanate and at least one other ethylenically unsaturated comonomer in an aqueous emulsion in the presence of a free-radical polymerization initiator and a chain transfer agent.

The ethylenically unsaturated comonomers polymerizable with TMI include butyl acrylate, methyl acrylate, methyl methacrylate, ethyl acrylate, styrene, $\alpha$-methylstyrene, p-methyl-$\alpha$-methylstyrene, and p-methylstyrene.

The copolymer suitably may contain from about 5 to about 80 mole percent repeating units derived from meta- or para-TMI and from about 20 to about 95 percent repeating units derived from the at least one other ethylenically unsaturated comonomer. Where styrene, $\alpha$-methylstyrene or p-methylstyrene are employed as comonomers, the amounts thereof generally should be limited to not more than 50 mole percent and preferably not more than 30 mole percent in the product copolymer to insure that such product copolymer is light stable in character, where light stability is necessary and/or desirable.

The free-radical polymerization initiator suitably may be potassium persulfate and sodium meta- bisulphite.

The chain transfer agent advantageously is a water-insoluble mercaptan. Preferably, the chain transfer agent is either dodecyl mercaptan or n-octyl thiol. It is a particularly surprising feature of the present invention that the use of thiols or mercaptans as chain transfer agents is efficacious in providing limited product copolymer molecular weight ranges, since in the emulsion polymerization system, one would expect such compounds to react with the free isocyanato groups contained in the TMI monomer. Surprisingly, it has been found that the reactivity of such thiols or mercaptans, if any, with the isocyanate groups is not such as to prevent the useful control of molecular weight of emulsion polymerization copolymer products.

It also is an unexpected aspect of the present invention that the polymerized emulsions resulting from the method of the invention are storage-stable for periods of several days and as long as 5-7 days, with 95 percent of the initial isocyanate groups based on monomer concentration thereof still being present, since one would expect reaction of such groups in the aqueous medium, i.e., the aqueous phase of such emulsions.

The emulsion polymerization of the invention usefully may be carried out at temperature above ambient in the range of from about 25° C. to about 60° C., and preferably from about 30° C. to about 50° C.

The aforementioned mercaptan or thiol chain transfer agents desirably are present in the emulsion polymerization reaction volume in an amount of from about 0.2 to about 10 mole percent based on the weight of monomers present. Under such conditions, it is possible to form emulsion copolymers having a molecular weight of from about 2,000 to about 70,000 (peak molecular weight). As indicated, such copolymers may contain from about 5 to about 80 mole percent repeating units derived from meta- or para-TMI and from about 20 to about 95 mole percent repeating units derived from at least one other ethylenically unsaturated comonomer polymerizable with TMI as selected from the group consisting of butyl acrylate, methyl acrylate, methyl methacrylate, ethyl acrylate, styrene, α-methylstyrene, p-methyl-α-methylacrylate, styrene, and p-methylstyrene.

A particularly advantageous copolymer composition is one containing from about 5 to about 25 mole percent repeating units derived from meta- or para-TMI and from about 75 to about 95 mole percent repeating units derived from methyl methacrylate. The method of the present invention permits the making of such copolymers having a molecular weight of from about 5,000 to about 10,000.

A particularly preferred terpolymer composition obtainable by the method of the present invention contains from about 5 to about 25 mole percent repeating units derived from meta- or para-TMI, from about 20 to about 40 mole percent repeating units derived from methyl methacrylate and from about 50 to about 70 mole percent repeating units derived from butyl acrylate.

The method of the present invention may be employed to form a substantially homogeneous copolymer of meta- or para-TMI and at least one other of ethylenically unsaturated comonomers mentioned above, by the following sequence of steps:

(a) forming a reaction volume comprising water, free-radical polymerization initiator, chain transfer agent and such one of said other ethylenically unsaturated comonomers to be incorporated into said copolymer as has the lowest reactivity thereof; and (b) adding meta- or para-isopropenyl- α,α-dimethylbenzylisocyanate and other remaining comonomers to be incorporated into said copolymer continuously to said reaction volume under emulsion polymerization reaction conditions while maintaining a substantially constant monomeric composition in said reaction volume, to form said copolymer with a substantially homogeneous polymeric composition.

The method described above for formation of substantially homogeneous copolymers (hereinafter denoted the "continuous addition method") usefully may be employed to produce a product copolymer having a molecular weight of from about 2,000 to about 70,000, with a comparatively narrow distribution of molecular weights within the product volume.

The copolymers of the present invention have utility in forming coating compositions comprising same and a curative comprising a cross-linkingly effective amount of a compound with free hydroxyl or amine functionality. Such curative compound may suitably include trimethylolpropane, ethylenediamine ketimine, diethylene glycol and 1,2,6-hexanetriol. Such composition may be applied in a film to a substrate, e.g., glass, wood or metal, and cured in the presence of moisture to form a coating on the substrate which is light-stable and solvent resistant in character.

In the broad practice of the present invention, the copolymer product of the polymerization reaction may be isolated from the aqueous emulsion following polymerization to the desired extent, by adding such aqueous emulsions to aqueous solutions of a salt such as calcium chloride, sodium chloride, or aluminum sulfate.

Alternatively, the copolymer product may be isolated from the aqueous emulsion after polymerization has been completed, by freezing the aqueous emulsion to a frozen solid to thereby break the aqueous emulsion, followed by thawing the frozen solid to yield a two-phase mixture comprising a reliquified aqueous phase and the copolymer as a solid phase, so that the solid copolymer readily may be separated form the reliquified aqueous phase, such as by mechanical separation. A particularly preferred method of separation is simple decanting of the two-phase mixture, or filtration of the two-phase mixture followed by vacuum drying of the copolymer filtrate at a temperature of from about 25° C. to about 40° C.

Reduction of the water content to below about 0.1 percent by weight can be accomplished, for example, by azeotropic distillation.

The character of the invention will be more fully apparent from the non-limiting examples set forth hereinafter, wherein all parts and percentages are by weight, unless otherwise specified.

EXAMPLE I

The following components were charged to a reaction flask:
  m-TMI—0.48 gm.
  butyl acrylate—1.80 gm.
  methyl methacrylate—0.72 gm.
  dodecyl mercaptan—0.15 gm.
  deionized water—24.0 gm.
  aq 2% Na-lauryl sulphate—1.0 gm.

The contents were stirred and sparged with nitrogen at ambient temperature for 20-30 minutes andd then the flask was heated to 40° C. in a water bath. A 0.30 ml. sample was taken for GC analysis. In separate, sealed bottles, solutions of potassium persulphate, 0.36 gms. in 7.5 ml. water, and sodium meta bisulphite, 1.08 gms. in 7.5 ml. water, were prepared and sparged with nitrogen for 5 minutes, to remove oxygen, using a syringe needle through a rubber septum. One milliliter of each solution was then added to the emulsion, by syringe, adding the potassium persulphate first. Samples of emulsion were taken at intervals and analyzed by GC for the remaining monomer content until the conversion of monomers was completed. The emulsion then was frozen to −18° C. overnight and next day, after allowing to thaw completely to room temperature, the mass of polymer was separated from the aqueous phase by decantation. The polymer then was washed with water and dried on a glass petri dish under vacuum at room temperature.

A yield of polymer of 2.0 gms. was recovered (67%) having a peak molecular weight of 16,000 by GPC, and a Tg of +2° C. by dynamic mechanical analysis.

EXAMPLE II

The procedure of Example I was employed to copolymerize m-TMI and P-TMI with a number of acrylic comonomers. Results are shown in Table I below.

TABLE I

Varying Mole % m-TMI Copolymers with n-Butyl Acrylate (n-BA) or Methyl Methacrylate (MMA)

| Reference | Mole % m-TMI | Comonomer | Polymerization Time (Minutes) | Glass Transition Temperature Tg (°C.) | Molecular Weight | Copolymer Yield (%) | Copolymer Solubility in $CH_2Cl_2$ |
|---|---|---|---|---|---|---|---|
| 1 | 5.0 | n-BA | 70 | −20 | 50,000 | 74 | Soluble |
| 2 | 10.0 | n-BA | 140 | — | — | — | Soluble X-linked |
| 3 | 20.0 | n-BA | 260 | −6 | — | 64 | Insoluble |
| 4 | 30.0 | n-BA | 300 | +33 | — | 74 | Some Gel |
| 5 | 50.0 | n-BA | 360 | +45 | 9,000 | 80 | Some Gel |
| 6 | 80 | n-BA | ∞ | No Polymerization | | — | — |
| 7 | 10.0 | MMA | 110 | — | — | 94 | Soluble |
| 8 | 20.0 | MMA | 160 | 132 | 8,200 | 66 | Soluble | n-BA = n-butyl acrylate
MMA = methyl methacrylate

EXAMPLE III

A 200 g. monomer batch of emulsion terpolymer was prepared incorporating low initiator levels, 1.0 mole % n-octyl mercaptan, and 20% monomers concentration. The m-TMI/MMA mixture was added continuously to the polymerization flask containing BA and the progress of the polymerization monitored by GC. Both m-TMI and MMA was added as required to maintain a constant ratio of monomers and extra initiator to maintain a steady polymerization rate. The polymerization was completed in 5 hours giving a GC monomer conversion of 99.3%. The progress of the polymerization was satisfactory, giving an even m-TMI distribution in the polymer throughout the polymerization.

The polymer was separated in the emulsion by freeze-thawing and dried by azeotroping in toluene. The water content of the final 35 wt. % polymer solution was 0.022% by weight (Karl-Fisher Analysis) and the isocyanate content 0.307 meq/g (100% of theory). The molecular weight of the terpolymer by GPC was 10,000 (peak); the Tg was 4° C., and the isolated yield of polymer 93%.

EXAMPLE IV

An emulsion copolymer of 10 mole percent m-TMI and 90 mole % n-BA was prepared at 10 weight percent monomer solids in the emulsion, using sodium lauryl sulfate as a surfactant, at a reaction temperature of 40° C. The effect of chain transfer agent concentration was evaulated by conducting three runs at chain transfer agent (n-octyl thiol) levels of 0.33%, 1.67% and 5.0%, respectively (based on weight of monomer in the polymerization emulsion). Results are shown in Table II below:

TABLE II

| Reference | Chain Transfer Agent Concentration % | Polymerization Time, minutes | Molecular Weight |
|---|---|---|---|
| 9 | 0.33 | 110 | 60,000 |
| 10 | 1.67 | 120 | 14,200 |
| 11 | 5.0 | 130 | 3,900 |

*by GPC (polystyrene standards)

These results show that the n-octyl thiol chain transfer agent at increasing levels of concentration was highly effective in reducing the molecular weight.

EXAMPLE V

Emulsion copolymers of 10 mole percent m-TMI and 90 mole percent n-BA were prepared to evaluate the effect on product copolymer molecular weight of the concentration of polymerization initiators. A mixture of potassium persulfate and sodium meta bisulfite was employed as the initiator, at varying concentrations. Results are shown in Table III below, wherein all samples contained 1.67% by weight (based on total of monomer weight) n-octyl thiol as the chain transfer agent.

TABLE III

| | moles × $10^7$ of each initiator | | | | |
|---|---|---|---|---|---|
| Reference | Potassium Persulphate | Sodium meta bisulfite | pH of emulsion | Molecular wt. | Conversion (mole %) |
| 12 | 9 | 38 | 7.4 | 6,200 | 40 |
| 13 | 19 | 76 | 7.2 | 10,000 | 40 |
| 14 | 45 | 190 | 6.8 | 14,200 | 100 |
| 15 | 89 | 350 | 4.8 | 13,800 | 100 |
| 16 | 180 | 760 | 3.3 | 11,600 | 100 |
| 17 | 1400 | 7000 | 2.9 | 42,000 | 100 |

As these data show, the copolymer product of the emulsion reaction has increasing molecular weight with increasing initiator levels. By appropriate choice of initiator and chain transfer agent concentrations in a given reaction system, it is possible to closely control the molecular weight and properties of the product copolymer, while achieving substantially complete conversion of monomers.

EXAMPLE VI

Emulsion terpolymers of 10 mole % m-TMI, 30 mole % MMA and 60 mole % BA were prepared by batch and in "continuous addition" processes. The letter process involved forming a reaction volume including water, initiator, chain transfer agent and MMA and thereafter continuously adding to such reaction volume m-TMI and BA at such rate as to maintain a constant monomeric composition in the reaction volume, to form a copolymer with a substantially homogeneous polymeric composition. The chain transfer agents were dodecyl mercaptan and octyl mercaptan. Results are shown in Table IV below.

TABLE IV

| Reference No. | Chain Transfer Agent | % mole | Process | Yield (%) | Molecular Weight | Tg (°C.) |
|---|---|---|---|---|---|---|
| 19 | dodecyl mercaptan | 5 | Batch | 65 | 16,400 | +2 |
| 20 | " | 1.67 | Batch | — | 20,100 | +6 |
| 21 | " | 0 | Batch | 67 | 37,000 | −10,+26 |
| 22 | octyl mercaptan | 3.3 | Batch | — | 7,800 | −2 |
| 23 | octyl mercaptan | 3.3 | Continuous Addition | — | 7,200 | 0 |
| 24 | " | 3.3 | Continuous Addition | — | — | 0 |
| 25 | " | 3.3 | Continuous Addition | — | — | — |
| 26 | " | 3.3 | Continuous Addition | 40 | 6,700 | 2 |
| 27 | octyl mercaptan | 3.3 | Continuous Addition | 88 | 6,700 | 0 |
| 28 | " | 3.3 | Continuous Addition | 84 | 5,700 | +4 |
| 29 | " | 3.3 | Continuous Addition | 93 | | |

The data in Table IV shows that octyl mercaptan was a more effective chain transfer agent then dodecyl mercaptan (cf. sample 22, wherein octyl mercaptan at 3.3 mole % (based on total monomer) gave a molecular weight of 7,800 with sample 19, wherein dodecyl (mercaptan) at 5 mole % yielded a molecular weight of 16,400). Further, samples 22–29 show that various runs with octyl mercaptan at 3.3 mole % concentration gave highly uniform and reproducible results (e.g., molecular weight of product copolymer in the range of 5,700 to 7,800).

EXAMPLE VII

Emulsion terpolymers containing 10 mole % m-TMI, 60 mole % BA and 30 mole % MMA was prepared at differing levels of n-octyl mercaptan as the chain transfer agent. Copolymer product was isolated in each instance by freezing and thawing of the emulsion, followed by decanting of the solid copolymer. Data are shown in Table V below.

EXAMPLE VIII

Samples 28 and 29 (see Examples VI and VII) were combined to yield a 10/60/30 mole % m-TMI/BA/MMA terpolymer having an equivalent weight of 1415 based on the solids content thereof. The terpolymer was then formulated into a coating formulation having the following composition:

Terpolymer—24.9 grams
G-Cure 867 RX 60—8.0 grams
dimethyl tin dilaurate—1.73 grams
Dow-Corning #1 control agent—1.1 grams
cellulose acetate butyrate—1.1 grams G-Cure 867 RX 60 (Henkel Corporation, Minneapolis, Minn.) is a hydroxyl-containing acrylic resin having a molecular weight of approximately 8000–9000, with 50% non-volatile content and an equivalent weight of 1000. The —NCO/—OH molar ratio in the formulation was 1.1 based on equivalent weights for the respective functionalities. Dow-Corning #1 (Dow Corning Corporation, Midland, Mich.) is a silicone flow control additive. The dimethyl tin dilaurate catalyst was introduced as a 10% weight solids dispersion in toluene, and the Dow-Corning #1 and cellulose acetate butyrate were each introduced as 10% (by weight) solutions of cellosolve acetate.

The formulation was very hazy in appearance when first prepared but cleared slightly after aging for a few minutes.

Draw-downs of the formulation were made on

TABLE V

| Reference | Quantity | n-octyl mercaptan (mole %) | Monomer Distribution | Yield of Polymers (%) | (g) | Tg | M. Wt. | Isolation Method |
|---|---|---|---|---|---|---|---|---|
| 27 | 15 | 3.03 | Good | 88 | 13.2 | 0 | 6700 | Frozen/Thaw |
| 28 | 15 | 3.03 | Good | 80 | 13.0 | 4 | 5700 | " |
| 29 | 15 | 3.03 | Good | 93 | 14.0 | −7 | 4364 | " |
| 30 | 30 | 1.51 | Poor | 76 | 23.8 | −7.5 | 9400 | Frozen/Thaw |
| 31 | 30 | 1.51 | Satisfactory | 87 | 26.2 | −2.5 | 8500 | " |
| 32 | 30 | 1.51 | Satisfactory | 81 | 21.8 | +4 | 10,700 | " |
| 33 | 30 | 1.51 | Fair | | | | | " |
| 34 | 30 | 1.51 | Satisfactory | | | | | " |

These data indicate that chain transfer agent concentrations on the order of 3 mole % gave a good (i.e., comparatively uniform) distribution of monomer in the product copolymer.

4″×12″ 1200S aluminum panels using a #46 wirecator. The draw-downs were applied at a 3.5 mil wet film thickness, with the applied coating films being exposed to ambient temperature conditions for 10 minutes before elevated temperature curing, at the cure time and temperature (cure schedule) conditions identified in Table VI below. The resulting films then were measured for dry film thickness, Knoop hardness, and mar and removal rub tests using MEK solvent. Results are shown in Table VI.

TABLE VI

| Reference | Time, min/Curing Temperature °C. | Dry Film Thickness mils | Knoop Hardness | MEK rub test mar (no. rubs) | MEK rub test remove (no. rubs) |
| --- | --- | --- | --- | --- | --- |
| 35 | 20/125 | 1.2 | 3.3 | — | 40 |
| 36 | 20/100 | 1.2 | 1.4 | — | 20 |
| 37 | 20/80 | 1.2 | 1.0 | — | 20 |

The appearance of all the cured films was slightly hazy and cratered in appearance.

EXAMPLE IX

A terpolymer was made from 12.6 g. of n-butyl acrylate, 5.0 g. of methyl methacrylate, and 3.4 g. of p-TMI (60 mole % n-butyl acrylate/30 mole % methyl methacrylate/10 mole % m-TMI) by emulsion polymerization in 253 g. of total reaction mixture.

The product mixture at room temperature was poured in a thin stream into 1200 ml. of 0.10 wt. % aluminum sulfate, $(Al_2(SO_4)_3 \cdot 18H_2O)$ solution vigorously stirred at room temperature. After stirring for onehalf hour, the solid was recovered by vacuum filtration. Vacuum drying at 25° C./1 mm Hg for 20 hours gave 19.2 g. of almost transparent, soft, solid polymer.

Depending on polymer composition and molecular weight TMI/acrylate and TMI/methacrylate copolymers also may be isolated by coagulating the emulsion in aqueous solution containing up to 10 wt. % concentrations of sodium chloride, sodium sulfate, calcium chloride, or other salts.

EXAMPLE X 29.4 grams of an emulsion of a copolymer of m-TMI (10 mole %) and ethyl acrylate (90 mole %) containing 2.94 grams of polymer were poured slowly into a stirred solution of 200 mls of 5% calcium chloride. A white flocculant precipitate formed which coagulated rapidly. This was filtered on a (No. 2) glass sinter and washed with de-ionized water in two 50 ml. lots. After drying in a vacuum oven at 40° C., 1.08 grams of dry 0 polymer were obtained.

A similar polymerization using 5% n-dodecyl mercaptan did not give a filterable precipitate with calcium chloride (low molecular weight polymers generally are difficult to filter).

EXAMPLE XI

The low molecular weight emulsion copolymer of Example X (polymerized with 5% n-dodecyl mercaptan) was cooled to −8° to −12° C. for 16 hours. During this time the emulsion broke and separated into two layers. The upper, aqueous layer was decanted off (alternatively, the polymer layer can be filtered and washed with water). After vacuum drying at 25°–40° C. (13 hours) a yield of 88% polymer (based on original monomers charged) was obtained, Tg=0° C., m.w.p. by GPC (Mw)=6700.

EXAMPLE XII

Preparation of p-TMI Copolymer

A copolymer was made by emulsion polymerization of a monomer mixture containing 90 mole % ethyl acrylate and 10 mole % p-TMI. The product was isolated by coagulation in a 5% solution of calcium chloride in water, followed by vacuum drying at room temperature.

EXAMPLE XIII

Crosslinking of Hydroxylated Resin with p-TMI Copolymer

A cellosolve acetate solution was made to contain 4.0% total solids consisting of stoichiometric quantities of the p-TMI copolymer and G-Cure 867-RX-60 (hydroxylated acrylic resin from General Mills Chemicals, Inc.). Immediately after adding 1.0 wt. % (on total resins) of dimethyltin dilaurate at room temperature, the solution was used to cast a thin film on a glass plate.

After heating the film-glass assembly at 110° C. for one hour in a forced-draft oven, the film was hard and optically clear. The assembly was then immersed in methylene chloride at room temperature. After five minutes with intermittent stirring, the film was swollen but remained coherent and insoluble.

EXAMPLE XIV

Moisture Curing of p-TMI Copolymer

A cellosolve acetate solution was made to contain 4.0% of the p-TMI copolymer. Immediately after adding 1.0 wt. % (on copolymer) of triethylenediamine (DABCO), the solution was used to cast a thin film on a glass plate.

After standing in the open air at room temperature for 24 hours, the film-glass assembly was immersed in methylene chloride. After five minutes with intermittent stirring, the film was swollen but remained largely insoluble.

The use of ketimines, e.g., ethylene-diamine ketimine as latent curing catalysts, mentioned hereinabove, is the subject matter of an invention by applicants' co-worker, Volker Arendt, issued as U.S. Pat. No. 4,518,582.

The foregoing patents, publications and applications are incorporated herein by reference. Many variations will suggest themselves to those skilled in this art in light of the above, detailed description. All such obvious variations are within the full intended scope of the appended claims.

What is claimed is:

1. A method of making a copolymer of meta- or para-isopropenyl-α,α-dimethylbenzylisocyanate and at least one other ethylenically unsaturated comonomer polymerizable therewith, comprising polymerizing said meta- or para-isopropenyl-α,α-dimethylbenzylisocyanate and at least one other ethylenically unsaturated comonomer in an aqueous emulsion in the presence of a free-radical polymerization initiator and a chain transfer agent.

2. A method according to claim 1, wherein said at least one ethylenically unsaturated comonomer is selected from the group consisting of butyl acrylate, methyl acrylate, methyl methacrylate, ethyl acrylate, styrene, α-methylstyrene, p-methyl- α-methylstyrene, and p-methylstyrene.

3. A method according to claim 1 wherein said copolymer contains from about 5 to about 80 mole percent repeating units derived from meta- or para-isopropenyl-α,α-dimethylbenzylisocyanate and from about 20 to about 95 mole percent repeating units derived from said at least one other ethylenically unsaturated comonomer.

4. A method according to claim 1 wherein said free-radical polymerization initiator is an admixture of potassium persulfate and sodium metabisulphite.

5. A method according to claim 1 wherein said chain transfer agent is a water insoluble mercaptan.

6. A method according to claim 1 wherein said polymerization is carried out at a temperature of from about 25° C. to about 60° C.

7. A method according to claim 1 wherein said chain transfer agent is selected from the group consisting of dodecyl mercaptan and n-octyl thiol.

8. A process according to claim 7 wherein said chain transfer agent is present in said polymerization in an amount of from about 0.2 to about 10 mole percent based on the weight of monomer.

9. A method according to claim 1 for forming a substantially homogeneous copolymer of meta- or para-isopropenyl-α, α-dimethylbenzylisocyanate, and at least one other ethylenically unsaturated comonomer polymerizable therewith selected from the group consisting of butyl acrylate, methyl acrylate, methyl methacrylate, ethyl acrylate, styrene, α-methylstyrene, p-methyl-α-methylstyrene and p-methylstyrene, comprising:

(a) forming a reaction volume comprising water, free-radical polymerization initiator, chain transfer agent and such one of said other ethylenically unsaturated comonomers to be incorporated into said copolymer as has the lowest reactivity thereof; and (b) adding meta- or para-isopropenyl-α,α-dimethylbenzylisocyanate and other remaining comonomers to be incorporated into said copolymer continuously to said reaction volume under emulsion polymerization reaction conditions while maintaining a constant monomeric composition in said reaction volume, to form said copolymer with a substantially homogeneous polymeric composition.

10. A method according to claim 1, further including isolating said copolymer from said aqueous emulsion after polymerization has proceeded to a desired extent, comprising adding to said aqueous emulsion an aqueous solution of a salt selected from the group consisting of calcium chloride, sodium chloride, aluminum sulfate, and sodium sulfate.

11. A method according to claim 1, further including isolating said copolymer from said aqueous emulsion after polymerization has proceeded to a desired extent, comprising:

(a) freezing said aqueous emulsion to a frozen solid to thereby break said aqueous emulsion, (b) thawing said frozen solid to yield a two-phase mixture comprising a reliquified aqueous phase and said copolymer as a solid phase, and (c) separating said copolymer from said reliquified aqueous phase.

12. according to claim 11, wherein said copolymer is separated in step (c) by filtration of said two-phase mixture and thereafter is vacuum dried at a temperature of from about 25° C. to about 40° C.

* * * * *